(12) United States Patent
Niimura

(10) Patent No.: US 7,420,596 B2
(45) Date of Patent: Sep. 2, 2008

(54) IMAGE SENSING APPARATUS FOR GENERATING IMAGE DATA AND AUTHENTICATION DATA OF THE IMAGE DATA

(75) Inventor: Ikuo Niimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 892 days.

(21) Appl. No.: 10/665,765

(22) Filed: Sep. 18, 2003

(65) Prior Publication Data
US 2004/0056962 A1    Mar. 25, 2004

(30) Foreign Application Priority Data
Sep. 20, 2002    (JP)    ............................. 2002-275830

(51) Int. Cl.
*H04N 5/76*    (2006.01)
*H04L 9/00*    (2006.01)

(52) U.S. Cl. .................. 348/231.3; 348/231.2; 380/277

(58) Field of Classification Search .............. 348/231.2, 348/231.3; 380/200, 203, 282, 255
See application file for complete search history.

(56) References Cited

U.S. PATENT DOCUMENTS

| | | | |
|---|---|---|---|
| 6,963,363 B1 * | 11/2005 | Ohmura ................... 348/231.3 |
| 6,968,058 B1 * | 11/2005 | Kondoh et al. .............. 380/200 |
| 6,970,561 B1 * | 11/2005 | Obana ......................... 380/28 |
| 2004/0201751 A1 * | 10/2004 | Bell et al. .............. 348/231.99 |

* cited by examiner

*Primary Examiner*—James M. Hannett
*Assistant Examiner*—Kelly L. Jerabek
(74) *Attorney, Agent, or Firm*—Morgan & Finnegan, L.L.P.

(57) ABSTRACT

An image sensing apparatus includes an image sensing unit and a key data control unit. The image sensing unit generates image data of a sensed image. The key data control unit (a) generates key data if a user turns on the power of the image sensing apparatus, and (b) erases the key data from the image sensing apparatus if a user turns off the power of the image sensing apparatus. The key data is used to generate authentication data. The authentication data is used to authenticate whether the image data is altered.

5 Claims, 8 Drawing Sheets

FIG. 8

| HEADER | FILE NAME |
| | CAMERA ID |
| | THUMBNAIL |
| | OTHER INFORMATION |
| BODY | IMAGE DATA |
| FOOTER | MARKER | AUTHENTICATION DATA (MAC DATA OR DIGITAL SIGNATURE DATA) |
| | ⋮ |

※ MARKER BEFORE AUTHENTICATION DATA IS INFORMATION FOR IDENTIFYING TYPE OF AUTHENTICATION DATA

IMAGE SENSING APPARATUS FOR GENERATING IMAGE DATA AND AUTHENTICATION DATA OF THE IMAGE DATA

FIELD OF THE INVENTION

The present invention relates to an image sensing apparatus for generating image data and authentication data of the image data.

BACKGROUND OF THE INVENTION

Presently, in order to authenticate the presence/absence of alteration of image data generated by a digital camera, an image authentication system by which authentication data obtained from image data is added to the image data is proposed.

In this system, key data necessary to generate authentication data must be safely managed. If this key data leaks, unauthorized authentication data can be generated. This may make it impossible to accurately authenticate the presence/absence of alteration of image data.

SUMMARY OF THE INVENTION

The present invention has been made to solve the above problem, and has as its object to make it difficult to analyze key data necessary to generate authentication data.

One image sensing apparatus of the present invention is an image sensing apparatus which generates image data and authentication data necessary for a process of authenticating whether the image data is altered, wherein key data necessary to generate the authentication data is erased in accordance with a predetermined condition.

Another image sensing apparatus of the present invention is an image sensing apparatus which generates image data and authentication data necessary for a process of authenticating whether the image data is altered, wherein generation of key data necessary to generate the authentication data is inhibited when a mode in which a set value in the image sensing apparatus is adjusted is to be turned on.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a view showing the file format of an image file having authentication data.

DETAILED DESCRIPTION OF THE PREFERRED EMBODIMENT

An embodiment of the present invention will be described below with reference to FIGS. 1 to 7.

Figure 1:
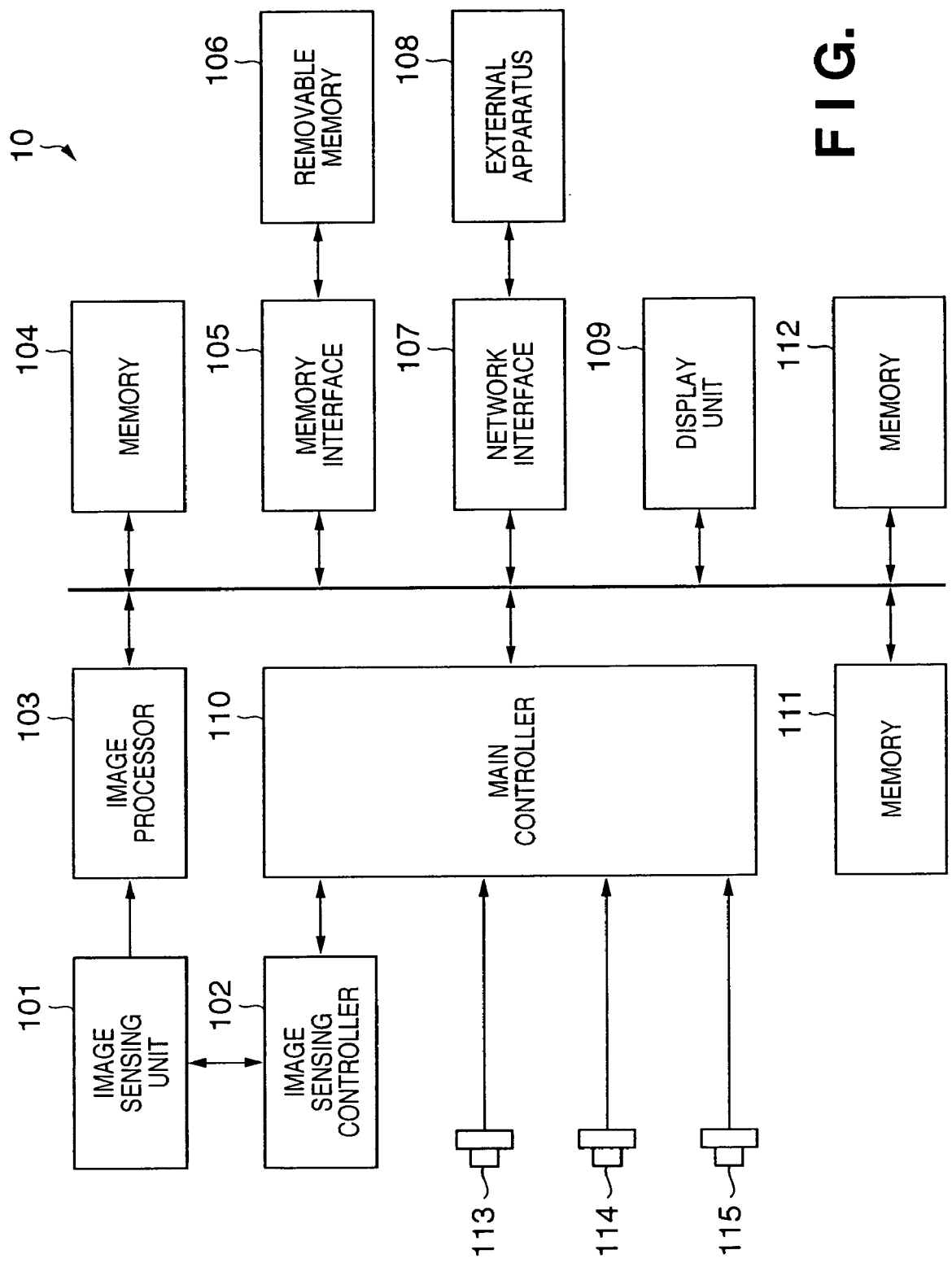
FIG. 1 is a block diagram showing the main parts of an image sensing apparatus according to an embodiment.

FIG. 1 is a block diagram showing the main components of an image sensing apparatus 10 according to this embodiment. The image sensing apparatus 10 is an apparatus (e.g., a digital camera, a scanner, a copying machine, or a portable information terminal with a digital camera) having a function of sensing an image by an image sensor. In this embodiment, the image sensing apparatus 10 will be explained by taking a digital camera as an example in order to simplify the explanation.

Referring to FIG. 1, an image sensing unit 101 generates image data of an image sensed by an image sensor. An image sensing controller 102 controls the operation of the image sensing unit 101 in accordance with instructions from a main controller 110. The image sensing controller 102 provides the main controller 110 with information pertaining to the image data generated by the image sensing unit 101. An image processor 103 adjusts the image quality of the image data obtained from the image sensing unit 101 in accordance with a plurality of preset image adjusting parameters, and compresses the adjusted image data in accordance with a predetermined image compressing method. A memory 104 stores various data.

A memory interface 105 writes an image file designated by the main controller 110 in a removable memory 106, and reads out an image file designated by the main controller 110 from the removable memory 106. The removable memory 106 can store a plurality of image files.

A network interface 107 transmits an image file designated by the main controller 110 to an external apparatus 108. The external apparatus 108 is an apparatus in which an application program for remotely controlling the image sensing apparatus 10, an application program for adjusting the image quality of image data in accordance with a plurality of image adjusting parameters, and the like are installed.

A display unit 109 displays reduced image data of an image sensed by the image sensing unit 101, reduced image data of an image file read out from the removable memory 106, and the like. The display unit 109 also displays information pertaining to a selected image.

The main controller 110 controls various functions of the image sensing apparatus 10. Also, the main controller 110 executes an authentication data generation process, key data management process, image file generation process, and the like. The authentication data generation process is to generate authentication data of image data obtained from the image processor 103, by using the hash value of the image data and key data (equivalent to a secret key in a secret key cryptographic system or a private key in a public key cryptographic system). The authentication data is necessary for a process of authenticating whether image data is altered. The key data management process is to manage generation and erasure of key data necessary to generate authentication data. The image file generation process is to generate an image file containing image data and its authentication data.

A memory 112 stores data A as a base of key data necessary to generate authentication data. A memory 111 also stores data B as a base of key data necessary to generate authentication data. The memories 111 and 112 are distributed in the image sensing apparatus 10. The memories 111 and 112 are nonvolatile memories (e.g., ROMs if they can be fixed memories, and EEPROMs or fresh memories if a user is to be allowed to freely set them). The data A and B are written when the apparatus of the embodiment is manufactured, but they can also be appropriately changed as described above.

A power switch 113 turns on or off the power supply of the image sensing apparatus 10. A shutter button 114 designates the start of image sensing. An alteration preventing switch 115 turns on or off an alteration preventing function as one function of the image sensing apparatus 10. This alteration preventing function generates authentication data from image data generated by the image sensing unit 101. Authentication data is necessary for a process of authenticating whether image data is altered. The alteration preventing function can be made valid (turned on) or invalid (turned off) during a period in which the power supply of the image sensing apparatus 10 is ON.

FIG. 8 shows the file format of an image file stored in the removable memory 106. An image file is made up of a header, body, and footer. However, an image which is sensed while the alteration preventing function is invalidated has no authentication data, or has no authentication data storage area in the footer. The header contains the file name, camera ID information for specifying a digital camera used in image sensing, and a thumbnail image. "Other information" includes information such as the image size (the numbers of pixels in the horizontal and vertical directions), the start position and size of the body, and the start position and size of the footer. The body stores compression-coded image data (e.g., JPEG encoded image data). "Marker" in the footer is information for identifying the type of authentication data. By checking this marker, therefore, it is possible to determine whether authentication data is MAC data or digital signature data. The MAC data is authentication data generated by using the hash value of image data and key data equivalent to a secret key in a secret key cryptographic system. The digital signature data is authentication data generated by using the hash value of image data and key data equivalent to a private key in a public key cryptographic system. Note that the marker and authentication data may also be stored in the header, instead of the footer.

The image sensing apparatus 10 according to this embodiment manages key data necessary to generate authentication data in accordance with one of first to fourth key data management methods and a fifth key data management method. The first to fifth key data management methods will be explained below.

(1) First Key Data Management Method

Figure 2:
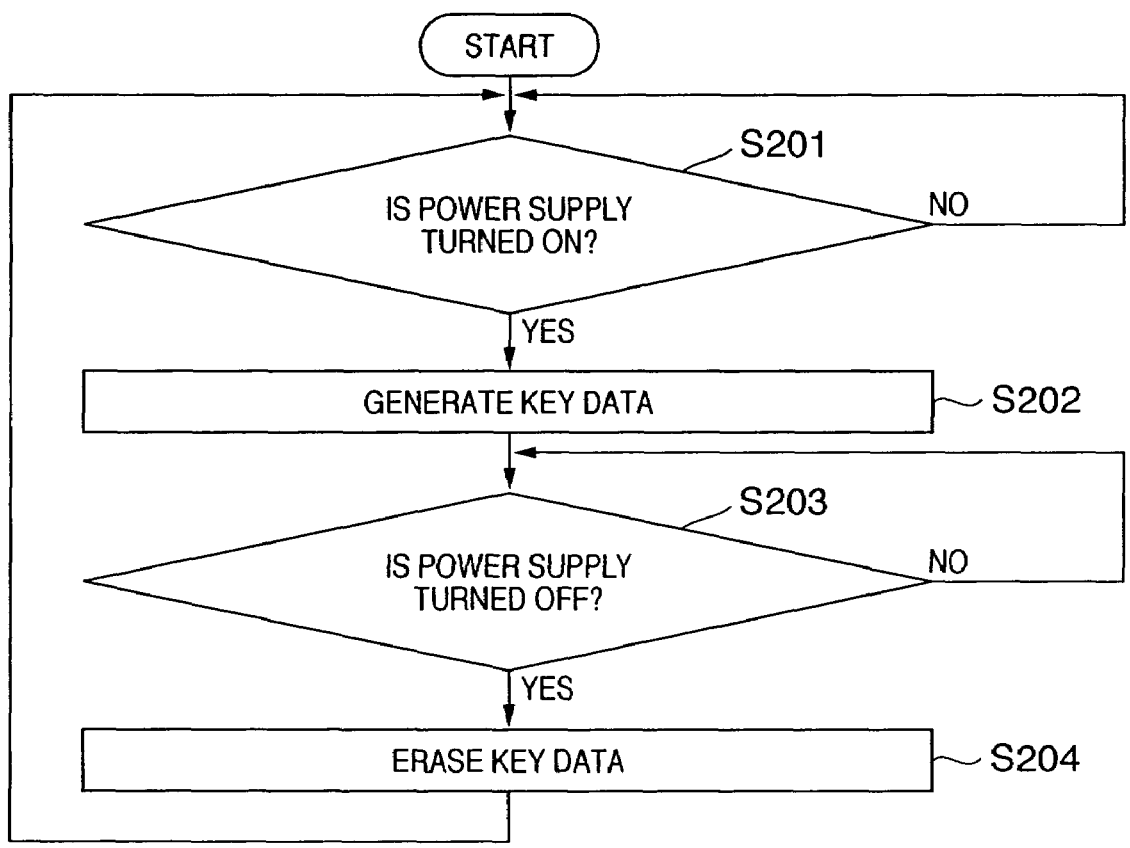
FIG. 2 is a flow chart for explaining a first key data management method.

FIG. 2 is a flow chart for explaining the first key data management method.

Step S201: The main controller 110 determines whether the user has turned on the power supply of the image sensing apparatus 10. If the power supply is turned on, the flow advances to step S202.

Step S202: The main controller 110 generates key data necessary to generate authentication data, from the data A and B distributed in the image sensing apparatus 10. Note that the key data can be the same whenever it is generated, or can be changed whenever it is generated a plurality of number of times.

Step S203: The main controller 110 determines whether the user has turned off the power supply of the image sensing apparatus 10. If the power supply is turned off, the flow advances to step S204.

Step S204: The main controller 110 erases the key data generated in step S202, in order to prevent a leak of the key data.

In the first key data management method as described above, a period during which the image sensing apparatus 10 holds key data can be limited to "a period (a period A in FIG. 7) during which the power supply of the image sensing apparatus 10 is ON". This makes analysis of the key data difficult. In practice, image sensing, storage, and the like are interposed between steps S202 and S203. However, these processes are omitted from FIG. 2 in order to clearly show the key data holding period.

(2) Second Key Data Management Method

Figure 3:
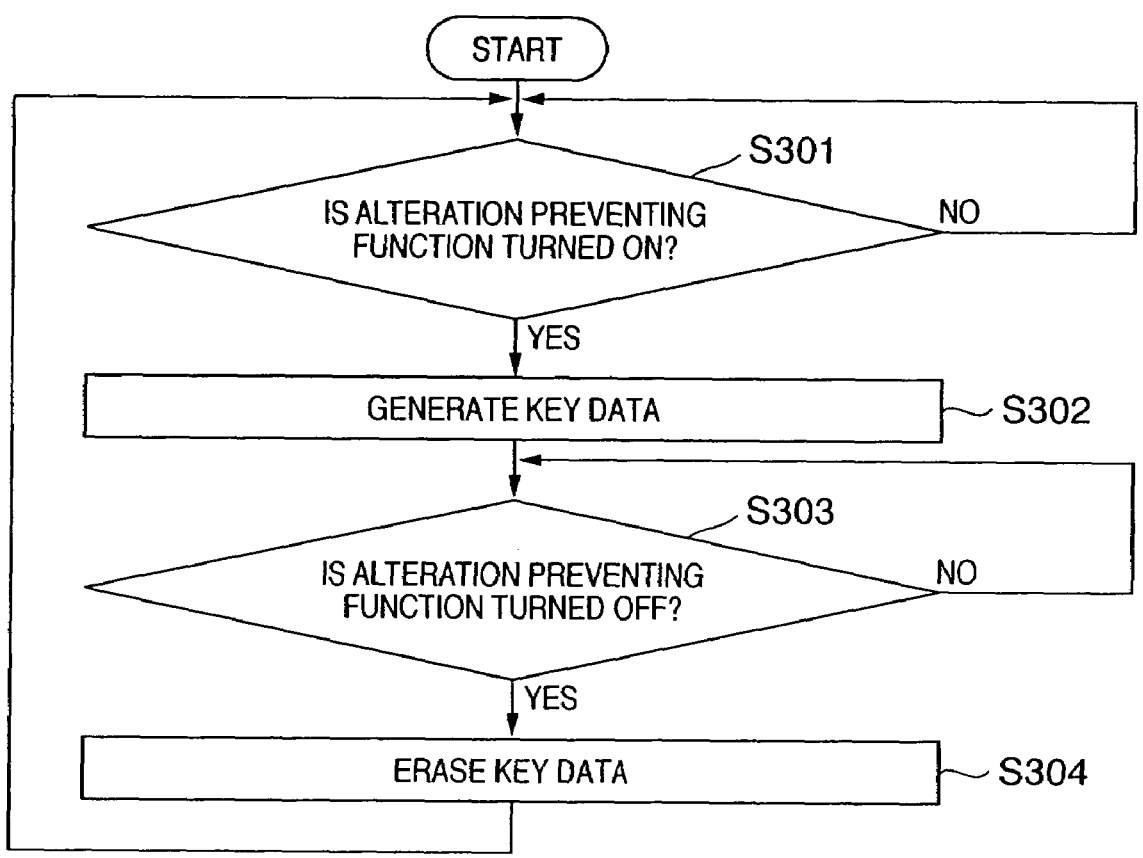
FIG. 3 is a flow chart for explaining a second key data management method.

FIG. 3 is a flow chart for explaining the second key data management method.

Step S301: The main controller 110 determines whether the user has turned on the alteration preventing function. If this function is turned on, the flow advances to step S302.

Step S302: The main controller 110 generates key data necessary to generate authentication data, from the data A and B distributed in the image sensing apparatus 10. Note that the key data can be the same whenever it is generated, or can be changed whenever it is generated a plurality of number of times.

Step S303: The main controller 110 determines whether the user has turned off the alteration preventing function. If the function is turned off, the flow advances to step S304.

Step S304: The main controller 110 erases the key data generated in step S302, in order to prevent a leak of the key data.

In the second key data management method as described above, a period during which the image sensing apparatus 10 holds key data can be limited to "a period (a period B in FIG. 7) during which the alteration preventing function is ON". This makes analysis of the key data difficult.

Figure 7:
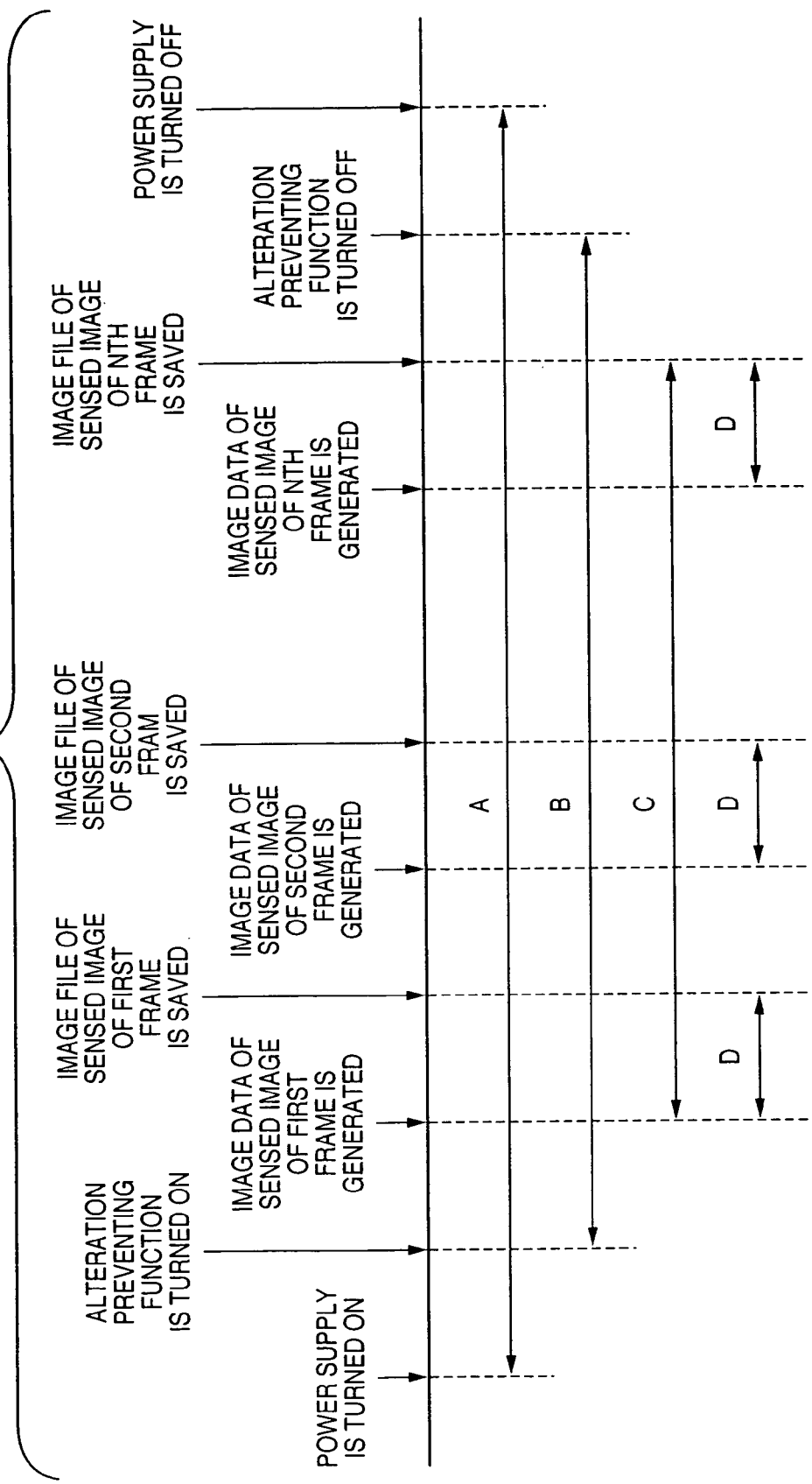
FIG. 7 is a view showing periods during which key data is held.

In addition, as shown in FIG. 7, the period during which the image sensing apparatus 10 holds key data in the second key data management method can be made shorter than that in the first key data management method. This makes analysis of the key data more difficult than in the first key data management method.

(3) Third Key Data Management Method

Figure 4:
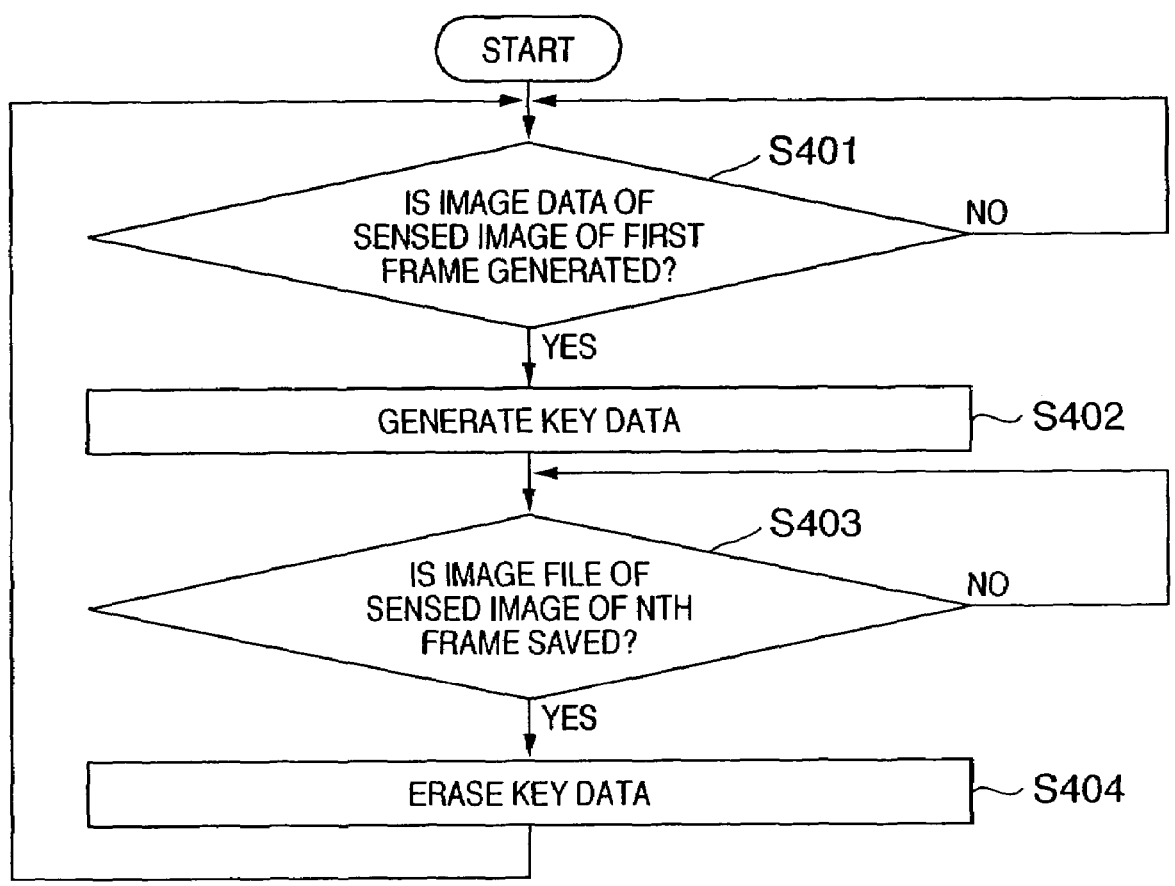
FIG. 4 is a flow chart for explaining a third key data management method.

FIG. 4 is a flow chart for explaining the third key data management method.

Step S401: The main controller 110 determines whether image data of a sensed image of the first frame is generated. If this image data is generated, the flow advances to step S402.

Step S402: The main controller 110 generates key data necessary to generate authentication data, from the data A and B distributed in the image sensing apparatus 10. Note that the key data can be the same whenever it is generated, or can be changed whenever it is generated a plurality of number of times.

Step S403: The main controller 110 determines whether an image file containing image data of a sensed image of the Nth ($2 \leq N \leq$ the number of frames which can be continuously subjected to image sensing) frame and authentication data of the image data is saved in the removable memory 106. If this image file is saved, the flow advances to step S404.

Step S404: The main controller 110 erases the key data generated in step S402, in order to prevent a leak of the key data.

In the third key data management method as described above, a period during which the image sensing apparatus 10 holds key data can be limited to "a period (a period C in FIG. 7) from the generation timing of image data of a sensed image of the first frame to the timing at which an image file containing image data of a sensed image of the Nth frame and authentication data of the image data is saved in the removable memory 106". This makes analysis of the key data difficult.

In addition, the period during which the image sensing apparatus 10 holds key data in the third key data management method can be made shorter than those in the first and second key data management methods. This makes analysis of the key data more difficult than in the first and second key data management methods.

(4) Fourth Key Data Management Method

Figure 5:
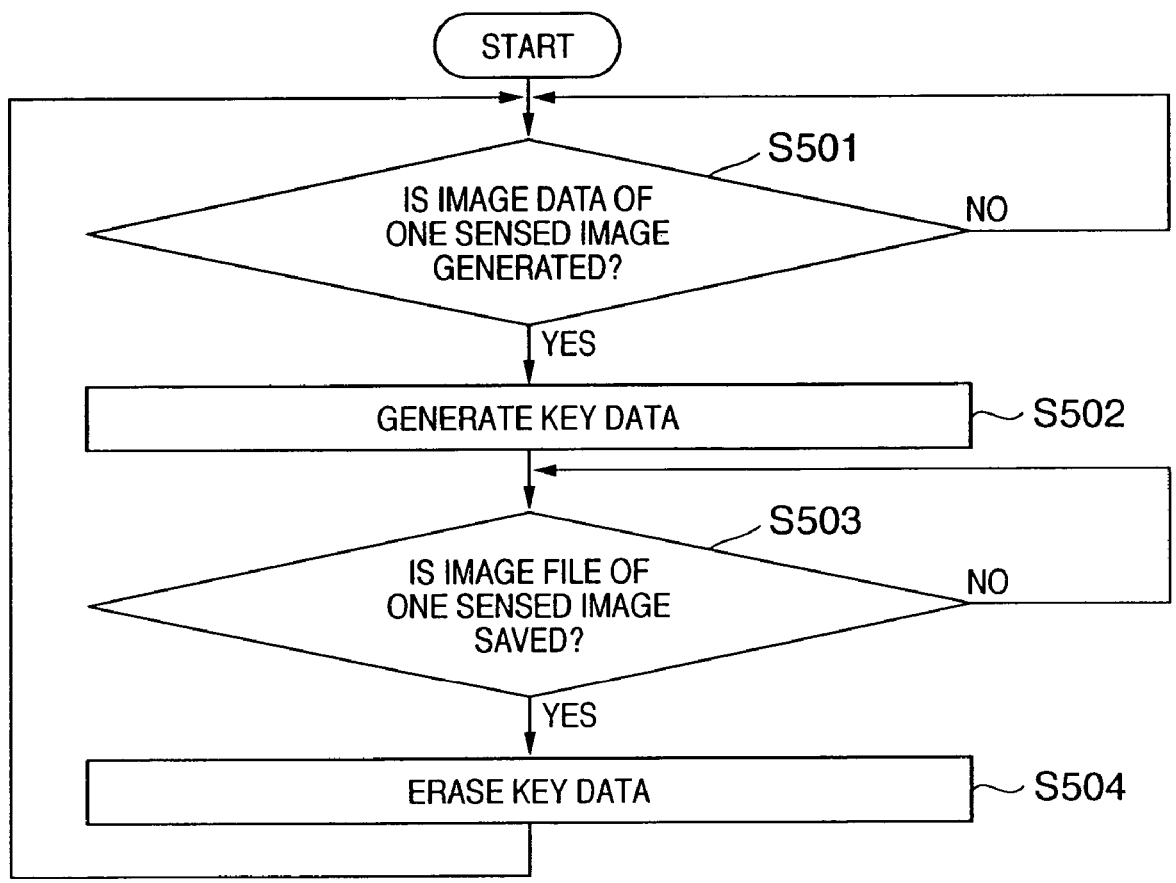
FIG. 5 is a flow chart for explaining a fourth key data management method.

FIG. 5 is a flow chart for explaining the fourth key data management method.

Step S501: The main controller 110 determines whether image data of one sensed image is generated. If this image data is generated, the flow advances to step S502.

Step S502: The main controller 110 generates key data necessary to generate authentication data, from the data A and B distributed in the image sensing apparatus 10. Note that the key data can be the same whenever it is generated, or can be changed whenever it is generated a plurality of number of times.

Step S503: The main controller 110 determines whether an image file containing the image data of one sensed image and authentication data of the image data is saved in the removable memory 106. If this image file is saved, the flow advances to step S504.

Step S504: The main controller 110 erases the key data generated in step S502, in order to prevent a leak of the key data.

In the fourth key data management method as described above, a period during which the image sensing apparatus 10 holds key data can be limited to "a period (a period D in FIG. 7) from the generation timing of image data of one sensed image to the timing at which an image file containing the image data of the sensed image and authentication data of the image data is saved in the removable memory 106". This makes analysis of the key data difficult.

In addition, the period during which the image sensing apparatus 10 holds key data in the fourth key date management method can be made shorter than those in the first, second, and third key data management methods. This makes analysis of the key data more difficult than in the first, second, and third key data management methods.

(5) Fifth Key Data Management Method

Figure 6:
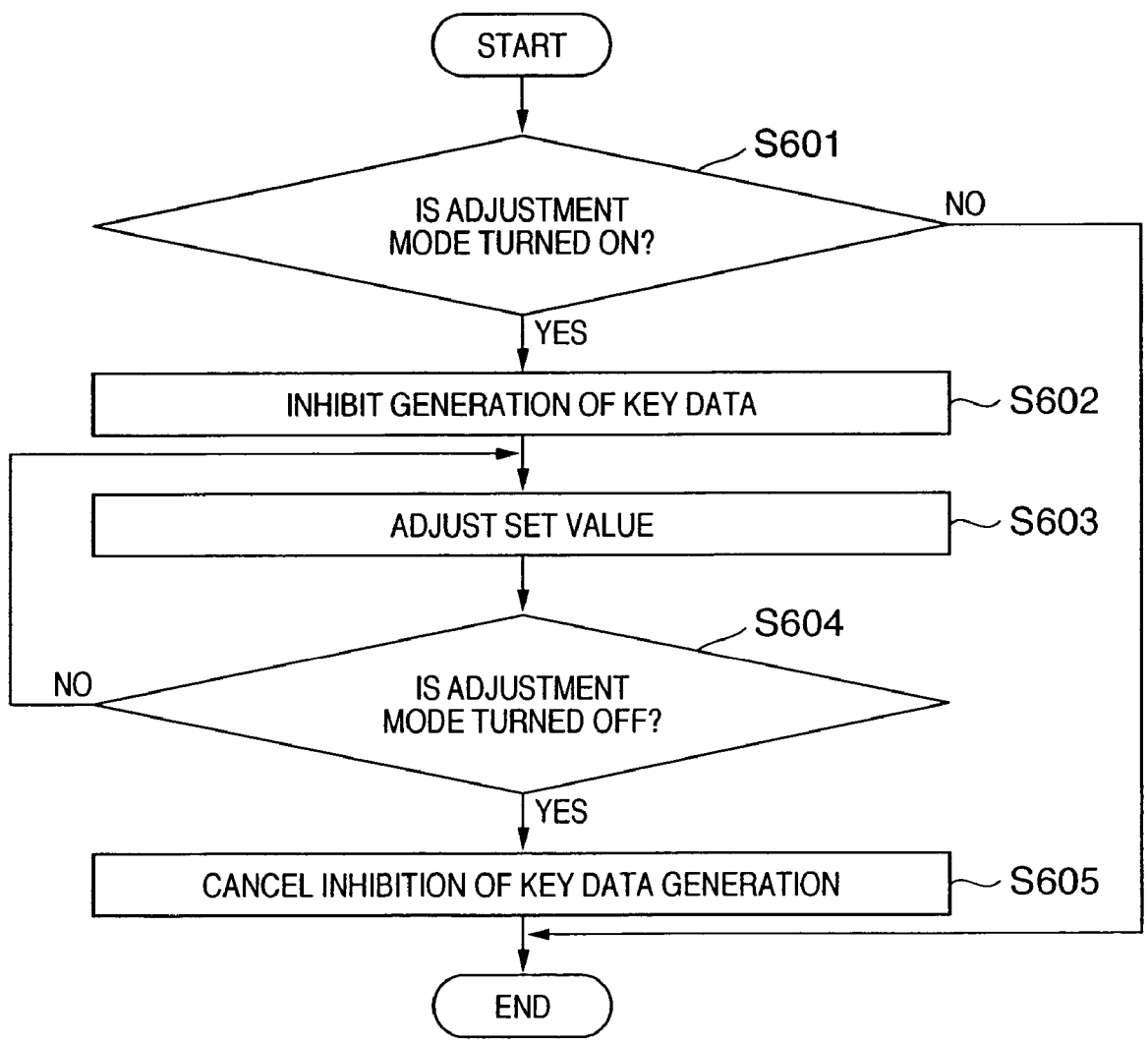
FIG. 6 is a flow chart for explaining a fifth key data management method.

FIG. 6 is a flow chart for explaining the fifth key data management method.

Step S601: The main controller 110 determines whether to turn on an adjustment mode. The adjustment mode is an operation mode in which the external apparatus 108 adjusts a plurality of image adjusting parameters in the image sensing apparatus 10. The image adjusting parameters are parameters for adjusting the image quality of image data of a sensed image. If the adjustment mode is to be turned on, the flow advances to step S602.

Step S602: The main controller 110 starts the adjustment mode and inhibits generation of key data. If key data is already generated at this point (e.g., if the fifth key data management method is combined with the first key data management method explained previously), this key data is erased before the adjustment mode is started. A leak of key data can be prevented by thus inhibiting generation of key data and erasing key data if the key data already exists.

Step S603: The image sensing apparatus 10 adjusts the image adjusting parameters in accordance with an operation from the external apparatus 108.

Step S604: The main controller 110 determines whether to turn off the adjustment mode. If the adjustment mode is to be turned off, the flow advances to step S605.

Step S605: The main controller 110 terminates the adjustment mode and cancels the inhibition of key data generation. However, if the fifth key data management method is combined with the above-mentioned first key data management method, key data is generated after the inhibition of key data generation is canceled.

In the fifth key data management method as described above, generation of key data can be inhibited during a period in which the operation mode of the image sensing apparatus is the adjustment mode. This makes analysis of the key data difficult.

In the present invention, analysis of the key data necessary to generate authentication data of image data can be made difficult.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus comprising:
   an image sensing unit that generates image data of a sensed image; and
   a key data control unit that (a) generates key data if a user turns on the power of the image sensing apparatus, and (b) erases the key data from the image sensing apparatus if a user turns off the power of the image sensing apparatus,
   wherein the key data is used to generate authentication data, and the authentication data is used to authenticate whether the image data is altered.

2. The image sensing apparatus according to claim 1, wherein the key data control unit generates the key data using two different data.

3. The image sensing apparatus according to claim 1, wherein the key data control unit generates the authentication data using the key data.

4. The image sensing apparatus according to claim 1, wherein the key data control unit (a) generates the key data using two different data, and (b) generates the authentication data using the key data.

5. The image sensing apparatus according to claim 1, wherein the image sensing apparatus is one of a digital camera and an apparatus including a digital camera.

* * * * *